United States Patent [19]

Warrington

[11] Patent Number: 4,984,561
[45] Date of Patent: Jan. 15, 1991

[54] CONTAINER FOR DISPOSING WASTE

[75] Inventor: Jack E. Warrington, Toronto, Canada

[73] Assignee: Green Cone Inc, Ontario, Canada

[21] Appl. No.: 285,016

[22] Filed: Dec. 16, 1988

[51] Int. Cl.$^5$ .................................................. F24J 2/00
[52] U.S. Cl. .................................. 126/417; 435/302; 435/313; 435/316; 71/9; 422/184; 210/170; 220/4 F
[58] Field of Search .................... 435/302, 313, 316; 126/417, 432; 210/170; 220/4 F, 18, 4 R; 71/9, 14, 901; 422/184

[56] References Cited

U.S. PATENT DOCUMENTS

| | | |
|---|---|---|
| 2,535,627 | 12/1950 | Earp-Thomas . |
| 2,857,862 | 10/1958 | Dwyer ............................ 126/41 E |
| 3,136,608 | 6/1964 | Lindström . |
| 3,708,085 | 1/1973 | Bumpas ............................ 220/18 |
| 3,947,357 | 3/1976 | Cherry ............................ 210/170 |
| 4,057,401 | 11/1977 | Boblitz ............................ 435/316 |
| 4,105,412 | 8/1978 | Petzinger ............................ 23/259 |
| 4,105,412 | 8/1978 | Petzinger . |
| 4,221,571 | 9/1980 | Rhoades . |
| 4,352,888 | 10/1982 | Tisbo et al. . |
| 4,490,926 | 1/1985 | Stokes . |

FOREIGN PATENT DOCUMENTS

| | | |
|---|---|---|
| 639516 | 4/1962 | Canada . |
| 3217725C1 | 4/1983 | Fed. Rep. of Germany . |
| 8530923.0 | 2/1986 | Fed. Rep. of Germany . |
| 3743651A1 | 7/1988 | Fed. Rep. of Germany . |
| G8807910.4 | 9/1988 | Fed. Rep. of Germany . |

OTHER PUBLICATIONS

BARDMATIC Pollution Control System, Tri-Canada Ltd., 2 pages, 10/1987.

Primary Examiner—Larry Jones
Attorney, Agent, or Firm—Nixon & Vanderhye

[57] ABSTRACT

A container for disposing of waste is provided. The container comprises an upper portion and a lower portion which are removably engaged to define an enclosure for the waste. The lower portion comprises a plurality of water permeable passages formed therein. The upper portion includes solar radiation collection means for heating the enclosure. The container is suitably used to decompose biodegradable waste. Preferably, the container is used to decompose daily household refuse.

36 Claims, 12 Drawing Sheets

CONTAINER FOR DISPOSING WASTE

FIELD OF THE INVENTION

The present invention relates to a container for disposing of waste.

BACKGROUND OF THE INVENTION

Suitable disposal of biodegradable waste is an increasing problem. In the past (and presently) it has been accepted practice to use landfill sites for dumping all non-toxic refuse, both biodegradable and nonbiodegradable. Generally, such a procedure involves digging a large hole in the ground and subsequently filling the hole with garbage to create a mound. Over time, grass may be grown over the mound. Unfortunately, such landfill sites usually tend to be unsightly, malodorous and possibly damaging to the ground water systems of communities surrounding them.

It has also been thought to be possible to use land-filled areas as sites to develop ski hills (when the site is in the form of a mound), constuct airport runways (when the site is level) and the like. Unfortunately, the biodegradable refuse decreases in volume as it decomposes. This usually leads to unwanted irregularities in the site which render it relatively unusable with respect to further development.

Recently, many municipalities and communities have instituted recycling programs which depend on households to separate garbage into degradable and nondegradable portions. The degradable portion generally comprises leftover food, bones, fruit rinds and the like. The non-degradable portion generally comprises glass, aluminum cans, paper and the like. The nonbiodegradable portion may be further separated and recycled as appropriate. Unfortunately, a disposal problem still exists for the degradable portion.

BRIEF DESCRIPTION OF THE PRIOR ART

The use of bacterial activity to decompose biodegradable waste has been known for a number of years. Generally, the bacteria require a food source to decompose the biodegradable waste. Certain types of biodegradable waste inherently contain such food sources. Alternatively, it is sometimes necessary to add to the biodegradable waste a food source for the bacteria. Examples of suitable food sources include calcium nitrate and commercially available mixed fertilizers. As the biodegradable waste is decomposed by bacterial activity, its temperature can rise to from about 30° to about 70° C.

U.S. Pat. No. 2,535,627 relates to an activated composter which is an aerobic digester activated by the addition of a composition containing aerobic bacteria and a medium suitable for growth with nutrients to maintain the bacteria in live condition for at least a year. The composition taught by this patent is disclosed as being suitable for decomposition of leaves, straw, garbage, sewage, feathers and the like.

U.S. Pat. No. 3,136,608 teaches an apparatus for the aerobic biological transformation of organic waste material. More specifically, the apparatus requires that the organic waste material be passed, by the action of gravity, through three separate compartments. The inclination of the bottom of the apparatus is critical to successfully converting the organic waste material into compost material.

U.S. Pat. No. 4,105,412 relates to a portable compost container which includes a base section for receiving fertilizer sap from the decomposing materials. The base section supports a perforate inner cylindrical section into which the organic waste refuse is placed. An outer cylindrical section is then placed over the perforate inner cylindrical section such that there is a space between the two sections. The whole container is covered by a lid.

U.S. Pat. No. 4,221,571 teaches a solar heated anaerobic digester which is adapted to decompose organic material to produce methane gas and a liquid fertilizer. A solar blanket apparatus is constructed around the bottom portion of the digester, containing a slurry of the decomposable organic material. The patent appears to be concerned with the production of methane gas from organic material (e.g. cattle manure). The products of digestion are methane and a slurry product which is referred to as "liquid fertilizer". This apparatus appears to be deficient in that it requires large amounts of water (7% solids slurry) which remains at the end of the digestion.

U.S. Pat. No. 4,352,888 teaches a container for holding organic matter during decomposition. The container comprises a number of rectangular integrated panels and is mounted to the ground by brackets which are buried below the ground. The container disclosed by this patent may be increased in size by connecting additional rectangular integrated panels. This container appears to be deficient in that it comprises vents to allow oxygen to enter and gases to escape the container. The emission of gases from the container could attract animals. Whilst such animals may be unable to penetrate the container itself, it would still be possible for them to enter the container by burrowing underground to the open bottom of the container.

It would be desirable to have an apparatus which is useful in decomposing biodegradable organic waste at a relatively accelerated rate. It would also be desirable to utilize solar energy to provide heat to assist the acceleration in decomposition rate. Further, it would be desirable to have an apparatus which does not emit odours that might attract animals. It would also be desirable to have an apparatus which is relatively impervious to the burrowing activities of small animals such as rodents, skunks and the like. Preferably, such a device would be simple to construct, install and use.

SUMMARY OF THE INVENTION

It is an object of the present invention to overcome or at least reduce one or more of the abovementioned disadvantages.

Accordingly, the present invention provides a container for disposing of waste comprising an upper portion and a lower portion which are removably engaged to define an enclosure for the waste, (i) the lower portion having a plurality of water-permeable passages formed therein; and (ii) the upper portion including solar radiation collection means for heating said enclosure.

As used herein the term "waste" refers to biodegradable organic waste.

Thus, the container of the present invention utilizes solar radiation collection techniques to accelerate the decomposition process by increasing the temperature of the container and its contents. Further, the container defines an enclosure which is relatively impervious to small animals. Moreover, attraction of small animals to the container is substantially inhibited since no odours are emitted from the inside of the container.

DETAILED DESCRIPTION OF THE INVENTION

Embodiments of the present invention will now be described by way of example only with reference to the accompanying drawings in which.

Figures 1, 2:
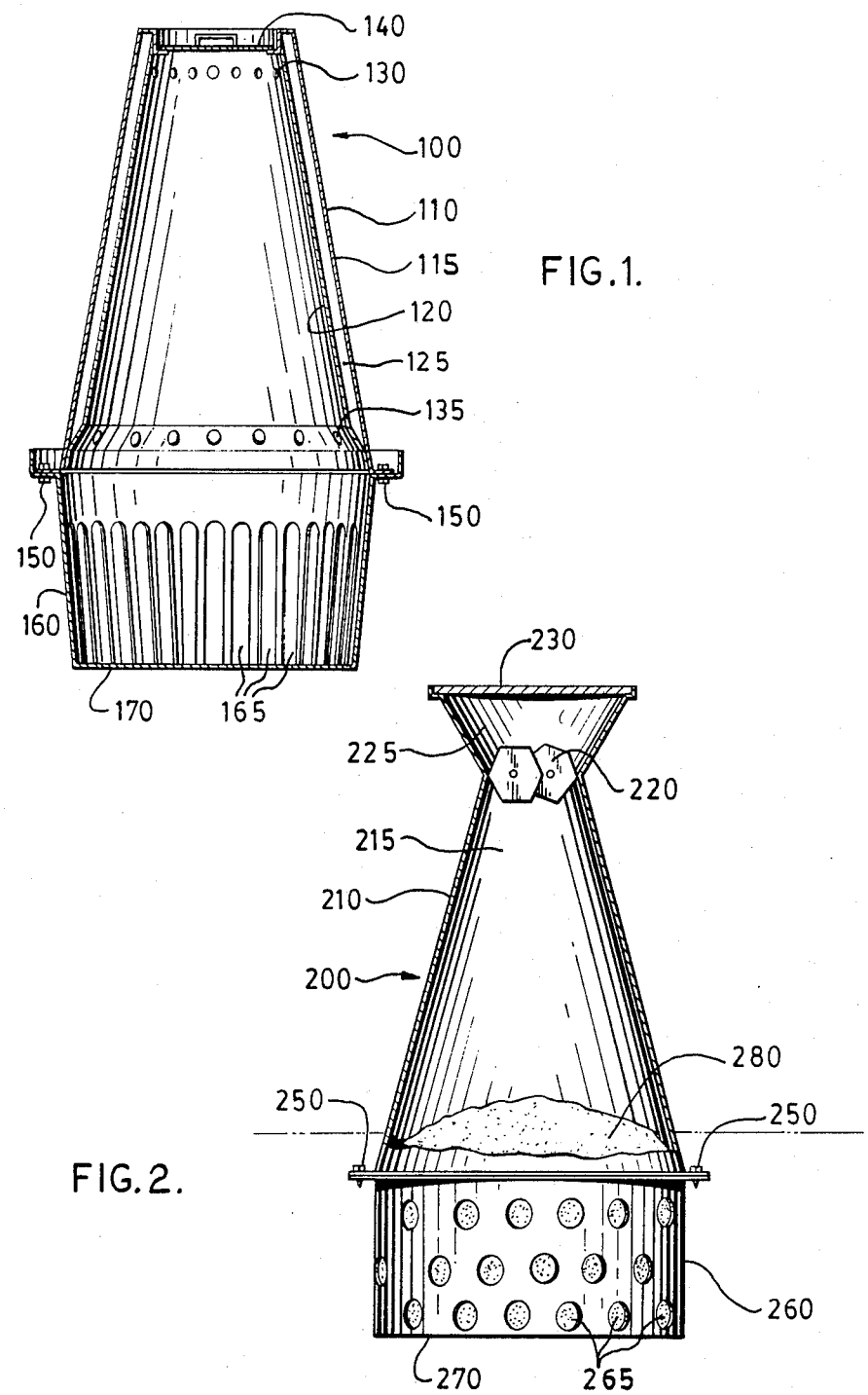
FIG. 1 is a cross-section of an embodiment of the invention.
FIG. 2 is a cross-section of a another embodiment of the invention.

Referring now to FIG. 1, there is illustrated a container 100 for storing waste comprising an upper portion 110 and a lower portion 160 which are removably engaged by fastening means 150.

Upper portion 110 comprises a transparent outer wall 115 and an opaque inner wall 120 thereby defining a solar collection chamber 125. Inner wall 120 further comprises a first set of openings 130 which are disposed circumferentially about the top of inner wall 120 and a second set of openings 135 disposed circumferentially about the lower portion of inner wall 120. Upper portion 110 is provided with an airimpermeable door 140 which may be used to introduce waste into container 100. Upper portion 110 may be constructed of any suitable material which is stable to year-round weather conditions. Non-limiting examples of such a material include plastic and fiberglass. Preferably, outer wall 115 is constructed from a material which transmits light at wavelengths of radiation in the visible region and inner wall 120 is constructed from a material which absorbs light at wavelengths of radiation in the visible region.

Lower portion 160 comprises a plurality of elongated passages 165. Lower portion 160 further comprises a bottom portion 170 which may comprise water permeable passages such as wire mesh and serves to close off the container thereby inhibiting entrance of small animals into the container. Alternatively, the whole of lower portion 160 may be a wire mesh arrangement. Lower portion 160 may be constructed from any suitable material which is stable to "below-ground" conditions. Non-limiting examples of such a material include plastic, steel and fiberglass.

Container 100 is installed by digging a hole to effectively cover at least the entire area of lower portion 160. It is desirable to install container 100 in an area which is subject to direct sunlight for at least a portion of the day.

In operation, lid 140 is temporarily removed to permit daily household waste to be placed in container 100. An activator, which serves to initiate and maintain the decomposition process, may be also added to container 100. The use of an activator is optional and depends on the composition of the waste which is added to container 100. During the day, direct sunlight strikes outer wall 115, thereby heating solar collection chamber 125. This results in an increase in the temperature of the air contained in solar collection chamber 125, which results in a decrease in the air density. The decreased air density serves to initiate circulation of air between the contents of container 100 and solar collection chamber 125 through openings 130 and 135.

Accordingly, as sunlight strikes container 100, the temperature of the container and its contents increases. The increased temperature of the contents serves to accelerate the decomposition process. The volume of the waste in the container decreases as the decomposition process proceeds. Accordingly, it is possible to use container 100 to dispose of daily household waste.

It is essential, for the container to operate properly, that water be present. The exact amount of water required for proper operation is difficult to specify and depends on the water content of the waste. For example, if the waste comprises materials which are high in water content (e.g. oranges, tomatoes and the like), it is not usually necessary to add additional water. If, however, the waste material comprises large amounts of low water content materials (e.g. orange rinds, bones and the like), it is usually necessary to add additional water.

It has been discovered, surprisingly and unexpectedly, that the container of the present invention may operate as a two-way pump which can expel or take in moist air. Specifically, during daylight, as container 100 heats up, the air therein expands thereby forcing air out of container 100 through slots 165. At night, as container 100 cools, the air therein contracts and extracts moist air from the surrounding ground through slots 165.

Referring now to FIG. 2, there is illustrated a container 200 for storing waste comprising an upper portion 210 and a lower portion 260 which are removably engaged by fastening means 250.

Upper portion 210 comprises a conically shaped solar radiation collection portion 215, a funnel 225 and an air-impermeable door 230. Upper portion 210 further comprises a chopper 220 disposed at the junction of solar radiation collection portion 215 and funnel 225.

Lower portion 260 comprises a plurality of openings 270. Lower portion 260 further comprises a bottom portion 270 which may optionally comprise water permeable passages similar to openings 265. Bottom portion 270 serves to close off container 200 thereby inhibiting entrance of small animals into the container.

As illustrated, container 200 is installed in ground by digging a hole which has effectively covered lower portion 260 and part of upper portion 210.

The operation of container 200 is very similar to that of container 100 illustrated in FIG. 1. An additional feature of container 200 is the provision of funnel 225 which serves to provide a larger opening for adding waste to container 200. A further additional feature of container 200 is the provision of a waste size reduction means 220 which serves to decrease the size of the waste as it enters container 200 and is exemplified by choppers, grinders and extruders. Size reduction of the waste may be suitably achieved by hand or electric operation of means 220. It has been found that a reduction in the size of the waste results in an accelerated rate of decomposition.

As illustrated, container 200, once installed, is relatively impervious to small animals. Thus, small rodents are unable to enter container 200 by burrowing underground. Moreover, animals such as dogs, raccoons and the like are unable to topple over container 200 after it is installed.

As waste is added to container 200, it forms a mound 280, the volume of which is reduced as the decomposition process proceeds. After an extended period of time it may be necessary to empty container 200. This may be suitably achieved by removing fastening means 250, subsequently removing upper portion 210 and emptying the degraded waste material from lower portion 260. Upper portion 210 may then be refastened to lower portion 260 thereby readying container 200 for further use.

It should be understood that while the container of the present invention is suitable for use with almost all biodegradable waste, it is most preferred to use the container with daily household waste. Accordingly, it is preferred to not use the container to store materials such as grass clippings, leaves and the like - such materials tend to occupy large volumes and are relatively slow to decompose. Thus, the container of the present invention is not intended to operate as a high volume "composter". Rather, the container of the present invention is most suitably used as a waste disposal unit for biodegradable waste which is separated from non-biodegradable waste during recycling programs.

We claim:

1. A container for disposing of waste, comprising:
   a lower portion, said lower portion having a plurality of water permeable passages formed therein;
   an upper portion removably engaged to said lower portion to define an enclosure for retaining said waste in the container, said upper portion including solar radiation collection means for heating said enclosure, said solar radiation collection means comprising an inner wall and an outer wall in spaced radiation thereby forming a solar collection chamber, said inner wall comprising means to permit air circulation to occur between said solar collection chamber and said enclosure; and
   closure means provided in said upper portion.

2. The container defined in claim 1, wherein said means to permit air circulation comprises a set of openings, said openings being circumferentially spaced about said inner wall.

3. The container defined in claim 2, further including a first and second set of openings, said first and second set of openings being spaced apart along the longitudinal axis of said container.

4. The container defined in claim 1, wherein said passages are defined by circumferentially spaced holes.

5. The container defined in claim 1, wherein said passages are elongate.

6. The container defined in claim 1, wherein at least a portion of said lower portion comprises a wire mesh portion thereby forming said passages.

7. The container defined in claim 6, wherein said wire mesh portion is constructed of steel.

8. The container defined in claim 1, wherein said lower portion is constructed of plastic.

9. The container defined in claim 1, wherein said lower portion is constructed of stainless steel.

10. The container defined in claim 1, wherein said lower portion is constructed of fiberglass.

11. The container defined in claim 1, wherein said upper portion is substantially conical in shape.

12. The container defined in claim 1, wherein said upper portion is constructed of plastic.

13. The container defined in claim 1, wherein said upper portion is constructed of fiberglass.

14. The container defined in claim 13, wherein said waste size reduction means is an extruder.

15. The container defined in claim 1, wherein said enclosure has a circular cross-section.

16. The container defined in claim 1, wherein said upper portion further comprises waste size reduction means.

17. The container defined in claim 16, wherein said waste size reduction means is a chopper.

18. The container defined in claim 16, wherein said waste size reduction means is a grinder.

19. The container defined in claim 1, wherein said outer wall is transparent and said inner wall is opaque.

20. A container for disposing of waste, comprising:
    a lower portion, said lower portion having a plurality of water prermeable passages formed therein;
    an upper portion removably engaged to said lower portion to define an enclosure for retaining said waste in the container, said upper portion including solar radiation collection means for heating said enclosure, said solar radiation collection means comprising a single wall, said upper portion further comprising waste size reduction means; and
    closure means provided in said upper portion.

21. The container defined in claim 20, wherein said waste size reduction means is a chopper.

22. The container defined in claim 20, wherein said waste size reduction means is a grinder.

23. The container defined in claim 20, wherein said waste size reduction means is an extruder.

24. The container defined in claim 20, wherein said passages are defined by circumferentially spaced holes.

25. The container defined in claim 20, wherein said passages are elongate.

26. The container defined in claim 20, wherein at least a portion of said lower portion comprises a wire mesh portion thereby forming said passages.

27. The container defined in claim 26, wherein said wire mesh portion is constructed of steel.

28. The container defined in claim 20, wherein said lower portion is constructed of plastic.

29. The container defined in claim 20, wherein said lower portion is constructed of stainless steel.

30. The container defined in claim 20, wherein said lower portion is constructed of fiberglass.

31. The container defined in claim 20, wherein said upper portion is substantially conical in shape.

32. The container defined in claim 20, wherein said upper portion is constructed of plastic.

33. The container defined in claim 20, wherein said upper portion is constructed of fiberglass.

34. The container defined in claim 20, wherein said enclosure has a circular cross-section.

35. The container defined in claim 20, wherein said outer wall is transparent and said inner wall is opaque.

36. The container defined in claim 1 or claim 20, wherein said upper portion further comprises means for introducing said waste and to said enclosure.

* * * * *